United States Patent
Ammon

(10) Patent No.: US 9,458,733 B2
(45) Date of Patent: Oct. 4, 2016

(54) LIMIT STOP DEVICE AND CHARGING UNIT

(75) Inventor: Volkhard Ammon, Pliezhausen (DE)

(73) Assignee: Bosch Mahle Turbo Systems GmbH & Co. KG (DE)

(*) Notice: Subject to any disclaimer, the term of this patent is extended or adjusted under 35 U.S.C. 154(b) by 984 days.

(21) Appl. No.: 13/697,289

(22) PCT Filed: Apr. 29, 2011

(86) PCT No.: PCT/EP2011/056875
§ 371 (c)(1),
(2), (4) Date: Nov. 9, 2012

(87) PCT Pub. No.: WO2011/141302
PCT Pub. Date: Nov. 17, 2011

(65) Prior Publication Data
US 2013/0056325 A1  Mar. 7, 2013

(30) Foreign Application Priority Data
May 11, 2010  (DE) .................. 10 2010 020 026

(51) Int. Cl.
*F01D 17/00* (2006.01)
*F01D 17/16* (2006.01)
*F02C 6/12* (2006.01)
*F02C 9/22* (2006.01)
*F16B 17/00* (2006.01)

(52) U.S. Cl.
CPC ............... *F01D 17/165* (2013.01); *F02C 6/12* (2013.01); *F02C 9/22* (2013.01); *F16B 17/006* (2013.01)

(58) Field of Classification Search
CPC ...... F01D 17/00; F01D 17/10; F01D 17/105; F01D 17/12; F01D 17/14; F01D 17/16; F01D 17/165
See application file for complete search history.

(56) References Cited

U.S. PATENT DOCUMENTS

| 3,560,030 A | 2/1971 | Macks et al. |
| 4,708,552 A * | 11/1987 | Bustos ................ F16B 13/126 248/231.91 |
| 5,599,147 A | 2/1997 | Luhm |
| 5,905,771 A | 5/1999 | Erbes et al. |

(Continued)

FOREIGN PATENT DOCUMENTS

| DE | 297255 C | 3/1972 |
| DE | 2711247 A1 | 9/1978 |

(Continued)

OTHER PUBLICATIONS

German Search Report for DE102010020026.3.

(Continued)

*Primary Examiner* — Richard Edgar
(74) *Attorney, Agent, or Firm* — Fishman Stewart PLLC

(57) ABSTRACT

A limit stop device for limiting an adjustment path of a mobile component relative to a stationary component may include a sleeve body configured to be inserted into an opening formed in the stationary component. The sleeve body may include a retaining segment disposed in the interior of the opening. A core body may be disposed in the interior of the sleeve body and be configured to radially brace the retaining segment against an inner wall of the stationary component thereby axially fixing the sleeve body on the stationary component. A stop surface may protrude into the adjustment path of the mobile component and be configured to limit the adjustment path of the mobile component.

22 Claims, 8 Drawing Sheets

(56) References Cited

U.S. PATENT DOCUMENTS 5,984,562 A    11/1999   Brandenstein et al.
7,252,464 B2    8/2007   Goth et al.

FOREIGN PATENT DOCUMENTS

| | | |
|---|---|---|
| DE | 8711918 U1 | 10/1987 |
| DE | 4444272 C2 | 12/1996 |
| DE | 19637015 A1 | 3/1998 |
| DE | 19717741 A1 | 10/1998 |
| DE | 102004058719 A1 | 6/2006 |
| DE | 602004006885 T2 | 1/2008 |
| DE | 102006052969 B4 | 7/2008 |
| DE | 102006061611 A1 | 7/2008 |
| DE | 102009022809 A1 | 12/2010 |
| GB | 274954 A | 7/1927 |
| GB | 2280231 B | 3/1997 |
| WO | WO-2009/102546 A1 | 8/2009 |

OTHER PUBLICATIONS

International Search Report for PCT/EP2011/056875.
English abstract for DE-4444272.
English abstract for DE-19717741.
English abstract for DE-102004058719.
English abstract for DE-102006052969.
English abstract for DE-102006061611.

\* cited by examiner

LIMIT STOP DEVICE AND CHARGING UNIT

CROSS-REFERENCES TO RELATED APPLICATIONS

This application claims priority to German Patent Application 10 2010 020 026.3, filed on May 11, 2010, and International Patent Application No. PCT/EP2011/056875, filed on Apr. 29, 2011, both of which are hereby incorporated by reference in their entirety.

TECHNICAL FIELD

The present invention relates to a limit stop device for limiting an adjustment path of a mobile component relative to a stationary component. The invention additionally relates to a charging unit, in particular an exhaust gas turbocharger, equipped with at least one such limit stop device.

BACKGROUND

In many areas of technology it can be required to limit the adjustment path of a mobile component relative to a stationary component in order to be able to define a predetermined relative position or end position at the end of the adjustment path. As a rule, this is achieved with a limit stop. Such a limit stop can for example be realised with the help of a limit stop device of the type mentioned at the outset.

In order to be able to offset manufacturing tolerances it is desirable to define the respective end position only towards the end of the assembly by the respective limit stop. To this end, such a limit stop device can be configured adjustable.

For example, it can be required with an exhaust gas turbocharger having a variable turbine geometry to limit the adjustment path of an actuator for actuating the variable turbine geometry in order to define an open position or a closing position of the variable turbine geometry.

From DE 10 2004 058 719 A1 an exhaust gas turbocharger with variable turbine geometry is known, on the turbine housing of which a console is fastened, which carries a servo drive for actuating an actuator of the variable turbine geometry. The actuator is a pivotable lever whose adjustment path in a pivot direction is limited by a limit stop. This limit stop is formed through the axial face end of a threaded pin, which is inserted in a threaded bore, which is formed on the console. By turning the threaded pin the position of the axial stop can be adjusted.

SUMMARY

The present invention deals with the problem of stating an improved embodiment for a limit stop device of the type mentioned at the outset or for a charging device equipped with such a limit stop device, which is characterized in particular by a simple adjustability or assemblability.

This problem is solved through the subjects of the independent claims. Advantageous embodiments are subject of the dependent claims.

The invention is based on the general idea of realising the limit stop device with the help of a sleeve body and of a core body, wherein the sleeve body can be inserted into an opening formed in the stationary component, while the core body is disposed in the interior of the sleeve body and radially braces the sleeve body against the stationary component. The axial and/or rotationally fixed fixing of the sleeve body on the stationary component is then effected through this bracing. In addition, the limit stop device is equipped with a stop surface which protrudes into the adjustment path of the mobile component, limiting its adjustment path. It has been shown that the sleeve body in the opening of the stationary component can be positioned comparatively easily and precisely in order to adjust the limit stop. The radial bracing can be realised with the help of the core body comparatively easily so that no position change between sleeve body and stationary component occurs any longer. Thus, a comparatively simple assemblability with simple adjustability of the limit stop is obtained.

Of particular advantage in this case is the fixing of the sleeve body on the stationary component exclusively through the bracing, which is realised with the help of the core body. Additional fastening measures for fixing the sleeve body on the stationary component can thus be omitted.

According to an advantageous embodiment, the core body in the assembled state can be axially and/or rotationally fixed in said sleeve body through the radial bracing against said sleeve body. In other words, fixing the core body on the sleeve body is likewise effected exclusively through the bracing. Thus, further fastening measures for fixing the core body to the sleeve body can also be omitted here. Because of this, the assembly is particularly simple and costs-effective.

With a preferred embodiment, the stop surface can be formed on the sleeve body. Alternatively it is likewise possible to form the stop surface on the core body. With a further alternative, a limit stop body can be provided in addition to the sleeve body and to the core body, which comprises the stop surface and which is disposed on the sleeve body or on the core body, i.e. attached thereto. Because of this, a suitable stop surface can be provided dependent on the respective application.

According to another embodiment, the sleeve body can comprise an internal cone in the retaining segment, which interacts with an external cone of the core body for the radial bracing. With this embodiment, the radial bracing between sleeve body and stationary component on the one hand and between core body and sleeve body on the other hand can be realised in a particularly simple manner in that an axial adjustment or axial adjusting force is generated between core body and sleeve body, with which the two cones are pressed into each other. Through the axial pressing into one another of the two cones the sleeve body is radially expanded, as a result of which the radial bracing against the stationary component occurs.

Practically, the cone angles of the internal cone and of the external cone can be selected identical in size in order to realise an areal force transmission. In addition or alternatively it can be provided to select the cone angles of the two cones such that a self-locking materialises, so that the radial bracing between the two cones in axial direction has no force component that is large enough in order to drive the two cones apart again. This self-locking can be supported or realised independently of the cone angles through a corresponding surface configuration of at least one of the two cones. For example, at least one of the two cones can have an increased friction surface, which for example can be realised through a suitable roughness or through a suitable adhesive coating or the like. In particular, it is also conceivable to arrange a friction-increasing sleeve or foil, for example in funnel form, between the two cones. The arrangement of a friction-increasing layer is likewise conceivable, which for example can be a chemical nickel matrix with silicon carbide particles embedded therein.

With another embodiment, the sleeve body can comprise an axially tapering internal cross section in the retaining segment, while the core body has an outer cross section convexly curved thereto. For example, the inner cross section can be configured as internal cone while the outer cross section can be configured crowned or spherical. By pressing or pushing the core body axially into the tapering region of the sleeve body, the desired radial bracing materialises. With a particularly advantageous embodiment, the core body can be configured as sphere. Assembly errors can be avoided because of this. Furthermore, spheres can be produced particularly cost-effectively.

With another embodiment, the sleeve body in the retaining segment can have at least one radially protruding projection on its outside. Through the radial bracing, this at least one projection can enter into an inner wall of the stationary component enclosing the opening, as a result of which a positive fixing between sleeve body and stationary component is formed. The respective projection can for example extend in an annularly circulating manner, which improves the axial locking. It is likewise conceivable to equip the respective projection with an axial extension, which improves the rotational locking. Practically, a plurality of projections are provided which are arranged axially in a row or are arranged next to one another in circumferential direction. A knurled outer contour for the sleeve body in the retaining segment is likewise conceivable, which is substantially formed through a multiplicity of annular projections arranged axially next to one another, which is superimposed by a multiplicity of straight-line projections arranged in circumferential direction next to one another.

Alternatively, it is also possible here to equip the sleeve body on its outside at least in the retaining segment with an increased roughness, which can be realised through a suitable friction coating or surface machining. Here, too, it is conceivable to arrange a friction-increasing sleeve or foil between the sleeve body and the stationary component. In this case, the sleeve body in the retaining segment comprises at least one friction-increasing layer on its outside, which can for example be produced with the help of silicon carbide particles, which to this end are incorporated in a chemical nickel matrix.

With a special embodiment, the core body can comprise a pull rod at least for the assembly, which during the assembly protrudes from the opening so that with the sleeve body positioned axially and/or with respect to its rotational position, axial forces can be introduced into the core body via this pull rod in order to create the radial bracing. Via this pull rod the core body, which is disposed in the interior of the sleeve body, is easily accessible in order to be able to introduce the axial movement or axial force required for creating the radial bracing.

Alternatively, the sleeve body can comprise a pulling sleeve section at least for the assembly, which during the assembly protrudes from the opening so that with the sleeve body positioned axially and/or respect to its rotational position, axial pulling forces can be introduced into the sleeve body via the pulling sleeve section. At the same time, axial pressure forces onto the core body can be introduced through the pulling sleeve section for creating the radial bracing. With this design, too, the axial adjustability or force introduction between sleeve body and core body is simplified in order to be able to create the desired radial bracing.

Practically, the pull rod can now be attached to the core body such that it breaks off because of the axial pulling forces as soon as the desired radial bracing is achieved. Analogue to this, the pulling sleeve section can be attached to the sleeve body such that it breaks off because of the axial pulling forces as soon as the desired radial bracing is achieved. Through this design, the assembly is simplified since no force measurements or the like have to be carried out in order to be able to detect the reaching of the finish-assembled state. Expressed in simple terms, with the limit stop device introduced here, the respective pull rod or the respective pulling sleeve section is pulled until it breaks off. The assembly process is thereby ended. The design of the respective predetermined breaking point ensures that a minimum bracing required for the desired fixing between sleeve body and stationary component on the one hand and between core body and sleeve body on the other hand, is achieved.

Preferentially, the sleeve body itself can comprise a stop section, which in the assembled state protrudes from the opening and which comprises the stop surface. In other words, the respective stop is then formed on the sleeve body. This design can be realised comparatively easily and requires only two components, namely the sleeve body and the core body. Practically, the stop surface can be formed through an annular axial face end of the stop section or through a closed axial end of the stop section. This embodiment thus concerns an axial stop, wherein the mobile component axially drives against the stop surface. Alternatively, it is likewise possible to form the stop surface on the sleeve body through a radial circumferential side of the stop section. With this embodiment, a radial limit stop is created, wherein the mobile component radially drives against the stop surface. Here, an embodiment can be particularly advantageous wherein the stop section of the sleeve body is designed eccentrically. Through the eccentricity of the stop section it is possible for the adjustment of the radial stop to rotate the sleeve body relative to the stationary component prior to the bracing in the opening. Through this rotation, the radial position of a section aligned with the adjustment path of the circumferential side of the stop section located outside and forming the stop surface changes because of the eccentricity of the stop section. Thus, by turning the sleeve body, the radial position of the radial limit stop can be adjusted. Through the bracing with the help of the core body, the adjusted position of the sleeve body can then be fixed.

With another advantageous embodiment, the stop surface can be formed on a limit stop body, which is disposed on the sleeve body, i.e. attached thereto, and namely preferentially to a stop section of the sleeve body protruding from the opening. Alternatively, the stop surface can also be formed on a stop section of the core body protruding from the opening.

Dependent on the respective installation situation, the pull rod or the pulling sleeve section can protrude from the opening on the same side on which the stop surface is also located. In this case, the opening can be configured as through-opening or as opening closed on one side. A design is likewise conceivable, wherein the pull rod or the pulling sleeve section protrude from the opening on a side facing away from the stop surface. In this case, the opening has to be configured as through-opening.

According to another embodiment, the sleeve body can have a radially projecting collar section, which is axially braced on an enclosure of the stationary component rimming the opening. In this case, the core body can be axially pressed in or driven into the sleeve body in the insertion direction of the sleeve body in order to create the desired radial bracing. With this embodiment, the axial positioning of the sleeve body is defined by the collar section relative to the stationary component. This embodiment is therefore suitable in a particular manner for realising a radial limit stop, wherein the associated stop surface is then practically formed on the sleeve body in the region of the collar section. Through a collar section that is shaped or arranged eccentrically relative to the sleeve body, the desired radial positioning of the radial section can be realised through the rotational position of the sleeve body in the opening before introducing the core body. This embodiment is characterized by a particularly simple assemblability.

With a particularly advantageous application of the limit stop device introduced here, for which protection is also claimed separately, and which also represents a separate solution according to the invention, the limit stop device can be used in a charging device, in particular in an exhaust gas turbocharger, which has a variable turbine geometry. The variable turbine geometry on the turbine side comprises a plurality of guide blades, which are jointly rotatable in order to be able to vary an inlet opening to a turbine wheel with respect to its cross section. For actuating the variable turbine geometry, an actuator can be provided, which is usually located on an outside of the turbine housing and can be driven with the help of a control device. To limit the adjustment path of the actuator, a limit stop device of the type described above can now be used. The mobile component then is the actuator, while the stationary component is the turbine housing or a console arranged on the turbine housing.

The variable turbine geometry can comprise an actuating ring in the interior of the turbine housing, which is rotationally adjustable and with which actuating arms of the adjustable guide blades can be jointly rotated, wherein a rotation of the actuating arms leads to a corresponding rotation of the guide blades. Usually, this actuating ring for its rotating actuation can be coupled to the actuator mentioned above. In order to limit the adjusting movement of the actuating ring in the one and/or in the other direction of rotation, at least one of the limit stop devices described above can be employed. The mobile component then is the actuating ring, while the stationary component then is a guide blade carrier of the variable turbine geometry, on which the adjustable guide blades are rotatably mounted. In particular, with this application, two limit stop devices can be employed in order to limit the actuating ring both in the one direction of rotation as well as in the other direction of rotation, so that both for the open position as well as for the closing position a defined end position each is ensured. Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters refer to same or similar or functionally same components.

BRIEF DESCRIPTION OF THE DRAWINGS

It shows, in each case schematically

DETAILED DESCRIPTION

Figure 1:
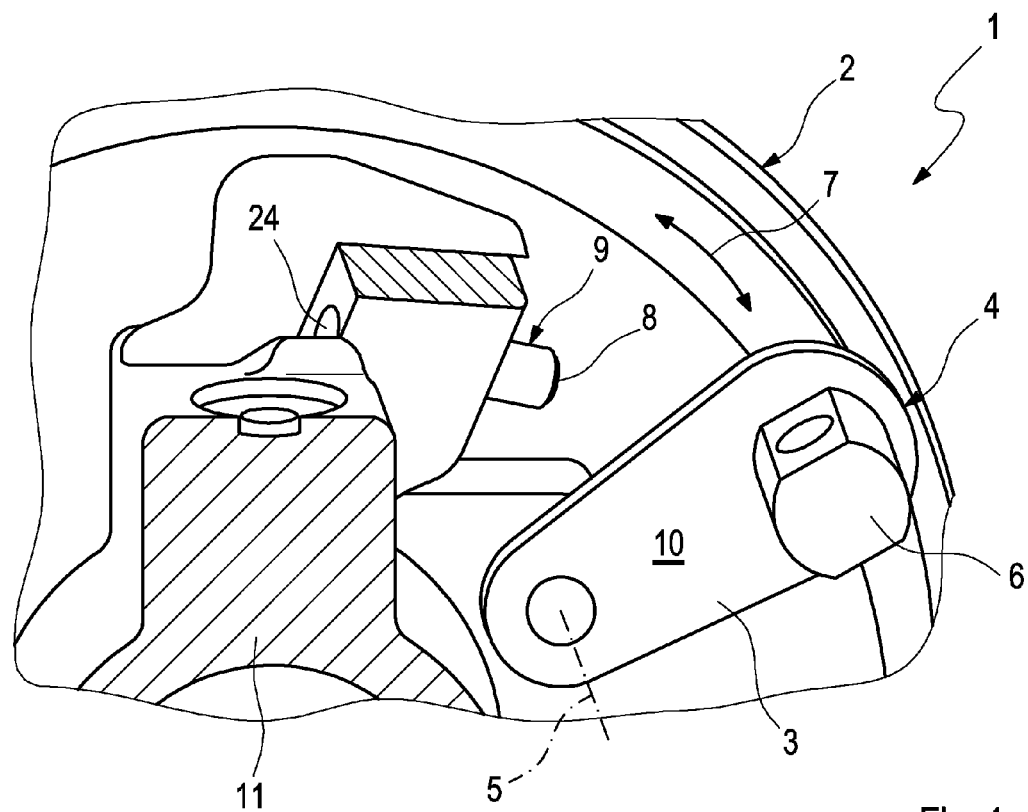
FIG. 1 a partially sectioned outer view of a charging device in the region of an actuator of a variable turbine geometry, FIG. 2-6 simplified schematic representations in longitudinal section of a limit stop device with different embodiments, FIG. 7 an axial view of a variable turbine geometry in a closing position, FIG. 8 a view as in FIG. 7, however in opposite viewing direction, FIG. 9 a view as in FIG. 7, however in an open position, FIG. 10 a view as in FIG. 9, however in opposite viewing direction, FIG. 11 a view as in FIG. 2-6, however with another embodiment, FIG. 12 a view as in FIG. 11, however with a further embodiment.
Figure 2:
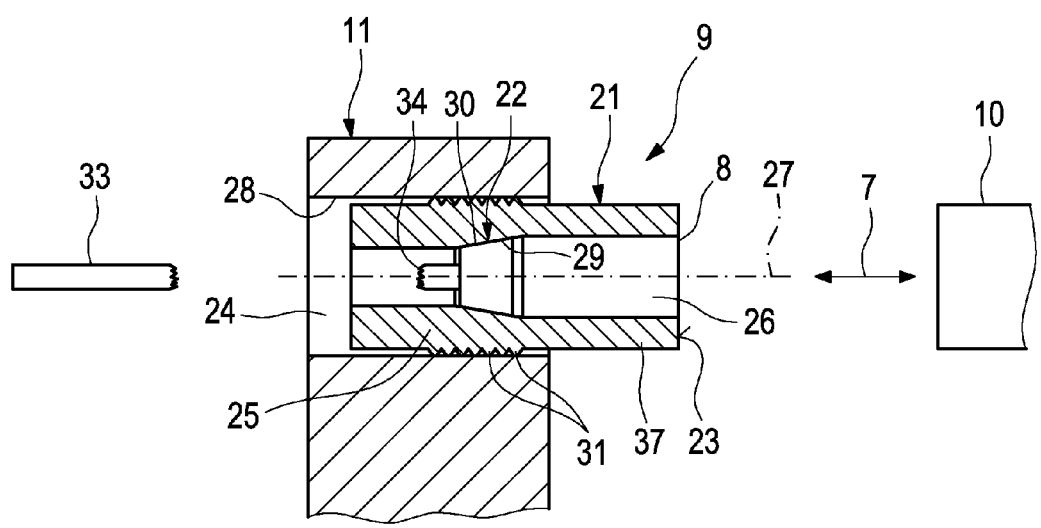
Figure 3:
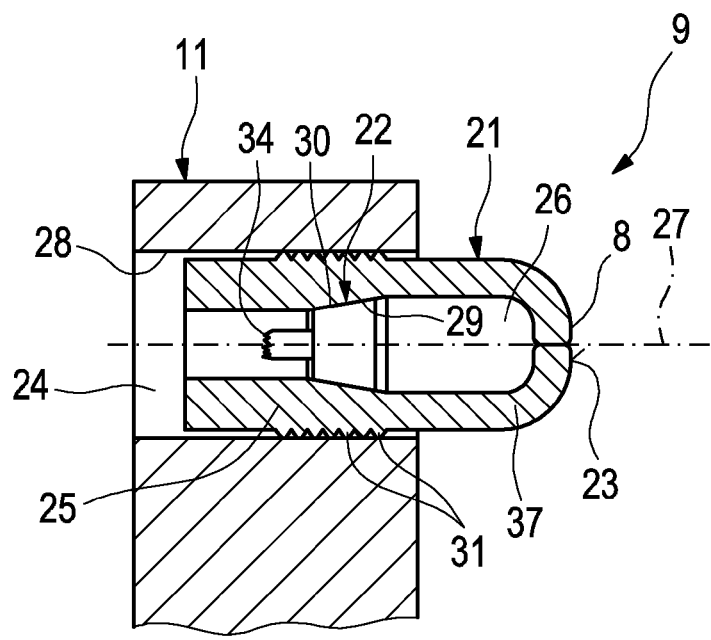

According to FIG. 1, a charging device 1, which preferably concerns an exhaust gas turbocharger, comprises a turbine housing 2, on the outside of which an actuator 3 of a variable turbine geometry 4 that is shown in more detail in FIG. 7-10 is disposed. The actuator 3 in this case is configured as actuating lever which is pivotably mounted about an axis of rotation 5 on the turbine housing 2. For its rotary actuation, the actuating member 3 is connected to an actuating drive which is not shown here via a coupling element 6.

Upon its actuation, the actuator 3 passes through adjustment path 7 indicated by a double arrow. This adjustment path 7 is limited at least in one adjusting direction by a limit stop 8, which is realised with the help of a limit stop device 9. Here, the limit stop device 9 is directly arranged on the turbine housing 2. It is likewise conceivable to attach the limit stop device 9 to a console which in turn is fastened to the turbine housing 2.

The limit stop device 9 generally serves for limiting an adjustment path 7 of a mobile component 10, which in the example of FIG. 1 is formed by the actuator 3, relative to a stationary component 11, which in the example of FIG. 1 is formed by the turbine housing 2.

According to FIG. 7-10, the variable turbine geometry 4 in the interior of the turbine housing 2 comprises an actuating ring 12, with the help of which simultaneously a plurality of actuating arms 13 can each be rotated about an own pivot axis 14. The actuating arms 13 are each connected to a guide blade 16 in a rotationally fixed manner via pins 15. The guide blades 16 are rotatably mounted on a disc-shaped guide blade carrier 17 via the respective pin 15. Here, the guide blade carrier 17 is located between the guide blades 16 and the actuating arms 13. The actuating ring 12 with the embodiment shown here is rotatably mounted on the guide blade carrier 17 via rotary bearings 18. Furthermore, the actuating ring 12 is connected to the actuator 3 in a suitable manner, while the coupling between actuating member 3 and actuating ring 12 is not shown here.

The actuating ring 12 is thus adjustable relative to the guide blade carrier 17, wherein a corresponding adjustment path 7 is again indicated by a double arrow. To limit this adjustment path 7 in the one and/or in the other direction of rotation, at least one limit stop device 9 can now be again provided. In the example of FIG. 7-10, two such limit stop devices 9 are provided in order to limit the adjustment path 7 of the actuating ring 12 in both directions of rotation. Because of this, a first stop 8 a can be defined for a closing through-opening position with minimal through-flow cross section to a turbine wheel of the charging device 1 which is not shown here in the first direction of rotation 19 indicated by an arrow. This closing position is reflected in FIGS. 7 and 8. With the other limit stop device 9, a second limit stop 8 can be realised in an opposite second direction of rotation 20 likewise indicated by an arrow in order to define an open position with maximal through-flow cross section to the turbine wheel. This open position is reflected in FIGS. 9 and 10.

With the embodiment shown in FIG. 7-10, the actuating ring 12 forms the mobile component 10 for the respective limit stop device 9, while the guide blade carrier 17 forms the stationary component 11 for the respective limit stop device 9. According to FIGS. 2-6, 11 and 12, the respective limit stop device 9 comprises a sleeve body 21, a core body 22 and a stop surface 23. The sleeve body 21 is inserted into an opening 24, which is formed in the stationary component 11. Here, the sleeve body 21 is inserted into the opening 24 so far that a retaining segment 25 of the sleeve body 21 is disposed in the interior of the opening 24. The sleeve body 21 is designed hollow and thus encloses an interior 26. Furthermore, the sleeve body 21 through its longitudinal centre axis 27 defines an axial direction.

The core body 22 is disposed in the interior 26 of the sleeve body 21 and creates a radial bracing between the retaining section 25 of the sleeve body 21 and an inner wall 28 of the stationary component 11 in the assembled state, which radially bounds the opening 24. Through this bracing, the sleeve body 21 is axially and rotationally fixed on the stationary component 11.

The stop surface 23 forms the limit stop 8 and in the assembled state protrudes into the adjustment path 7 of the mobile component 10 and because of this forms the desired bounding of the adjustment path 7.

The core body 22 in the assembled state is axially and rotationally fixed in the sleeve body 21 through the radial bracing, which also acts between the core body 22 and the retaining segment 25 of the sleeve body 21.

For realising this radial bracing, the sleeve body 21 with the embodiments shown in FIGS. 2-6 and 11, comprises an internal cone 29 in the retaining segment 25. Fitting to this, the core body 22 comprises an external cone 30. For creating the radial bracing, the internal cone 29 interacts with the external cone 30. An axial adjustment or force introduction between sleeve body 21 and core body 22 leads to the creation of the radial bracing because of the wedge effect of the two cones 29, 30. Practically, the cones 29, 30 can be configured or matched to each other in such a way that a self-locking or self-clamping occurs, at the latest when the desired radial bracing is reached. This can be realised through a suitable selection of the conicities and/or through a suitable matching of the friction coefficients. Practically, the conicities of the two cones 29, 30 are selected identical in size in order to achieve as large an areal contacting and force transmission between core body 22 and sleeve body 21 as possible.

Figure 12:
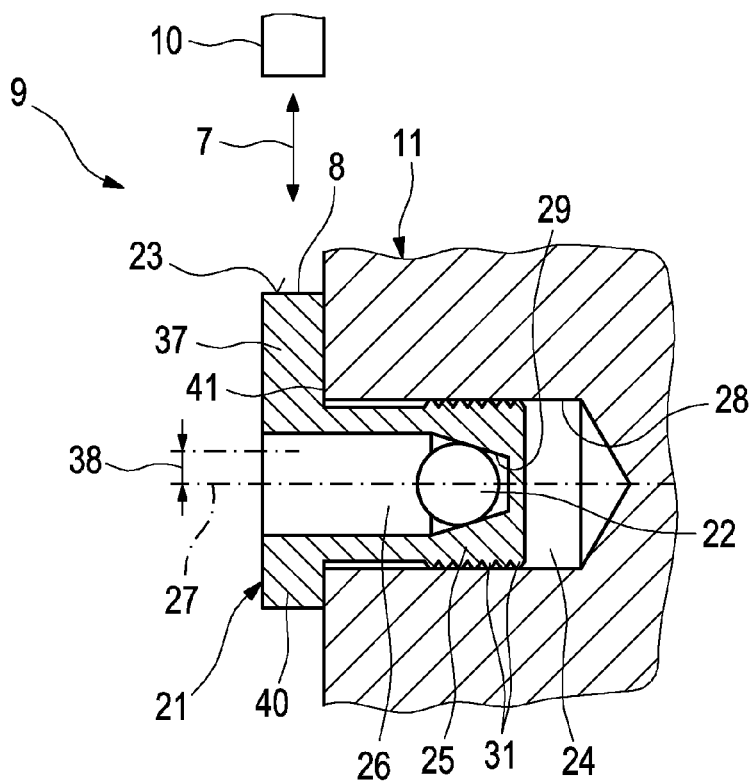

With the embodiment shown in FIG. 12, the sleeve body 21 comprises an internal cross section that axially tapers, i.e. in the direction of the longitudinal centre axis 27, for realising the radial bracing in the retaining segment 25. In the example, this cross-sectional taper is again realised through an internal cone 29. In principle, however, other tapering contours, in particular curved contours, are also conceivable here. Furthermore, with this embodiment, the core body 22 is provided with an outer cross section which with respect to the internal cross section is convexly curved. For example, the outer contour of the core body 22 is curved in a crowned spherical manner towards the sleeve body 21 in the section facing the internal cone 29. FIG. 12 shows a particularly advantageous embodiment, wherein the core body 22 is configured as a sphere.

In order to improve the fixing of the sleeve body 21 to the stationary component 11, the sleeve body 21 can comprise at least one radially projecting protrusion 31 in the retaining segment 25 on its outside. In the shown examples, a plurality of protrusions 31 are provided, each of which run annularly in the circumferential direction. In addition to this, the protrusions 31 are arranged axially adjacent to one another. The protrusions 31 dig themselves into or enter the inner wall 28 on creating the radial bracing and because of this create a positive coupling in the axial direction. At any rate, they increase the friction between sleeve body 21 and stationary component 11.

Additionally or alternatively, a straight-line protrusion 31 can also be provided, which can in particular extend axially. Likewise, a plurality of such protrusions 31 extending linearly or axially can be provided, which in the circumferential direction are arranged adjacent to one another. Additionally or alternatively it is likewise possible to embody the outside of the sleeve body 21 in the retaining segment 25 in a knurled manner.

Alternatively to such protrusions 31, the sleeve body 21 can have a friction-increasing layer in the retaining segment 25 on its outside, which here is likewise designated with 31. Such a friction-increasing layer 31 can for example be produced by means of silicon carbide particles, which to this end are incorporated in a chemical nickel matrix. Such a friction-increasing coating 31 can be applied in a particularly easy manner.

Figure 4:
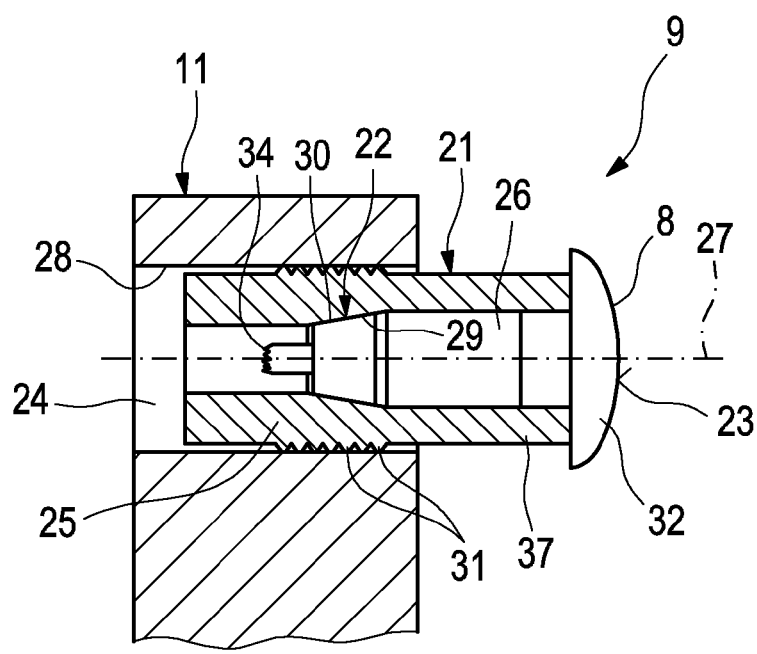

With the embodiments shown in FIGS. 2, 3, 6, 11 and 12, the stop surface 23 is directly formed on the sleeve body 21. With the embodiment shown in FIG. 5, the stop surface 23 is exemplary formed on the core body 22. With the embodiment shown in FIG. 4, a limit stop body 32 is provided in addition to the sleeve body 21 and to the core body 22, on which the stop surface 23 is formed. In the example of FIG. 4, the limit stop body 32 is disposed on the sleeve body 21. With another embodiment, the limit stop body 32 can also be arranged on the core body 22.

Exemplarily for the embodiments of FIGS. 2-5 and 11, FIG. 2 shows a pull rod 33, which for the assembly is located on the core body 22. In particular, core body 22 and pull rod 33 are integrally produced from one piece. Upon the assembly, this pull rod 33 protrudes from the opening 24. With the sleeve body 21 positioned axially and/or relative to the stationary component 11 with respect to its rotary position, an axial pulling force can be introduced into the core body 22 via the pull rod 33, in order to create the radial bracing between core body 22 and sleeve body 21 on the one hand and between sleeve body 21 and stationary component 11 on the other hand. Practically, the pull rod 33 is attached to the core body 22 in this case in such a manner that it breaks off because of the axial pulling forces mentioned above, as soon as the desired radial bracing is achieved. Noticeable in FIGS. 2-5 and 11 is a predetermined breaking point 34, via which the pull rod 33 was connected to the core body 22.

Figure 6:
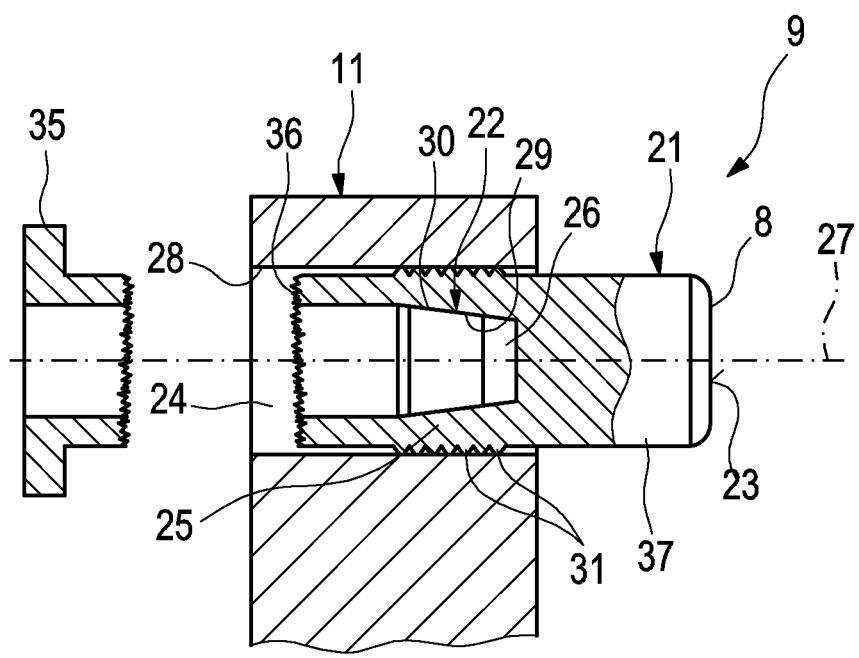
Figure 7:
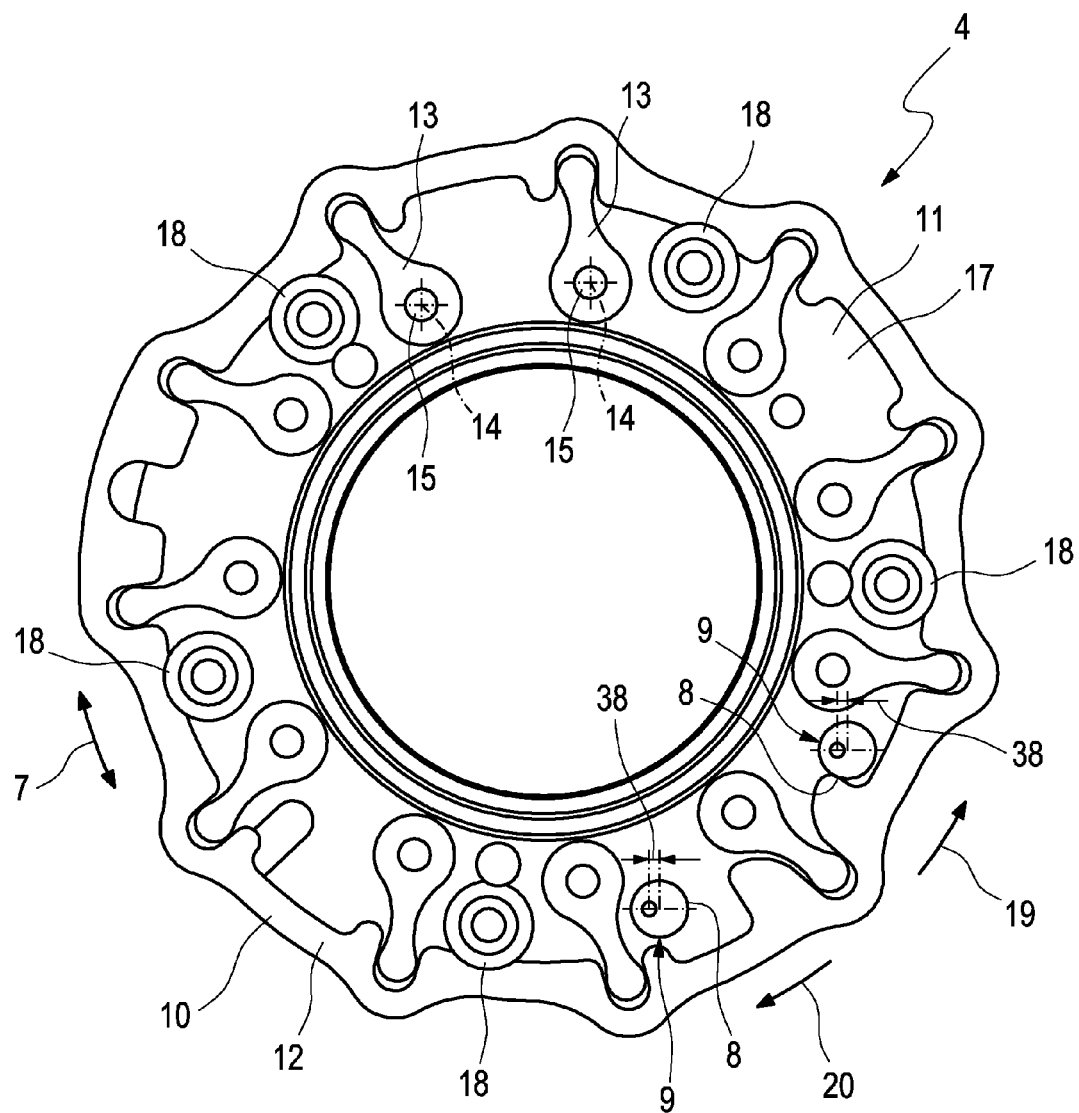
Figure 8:
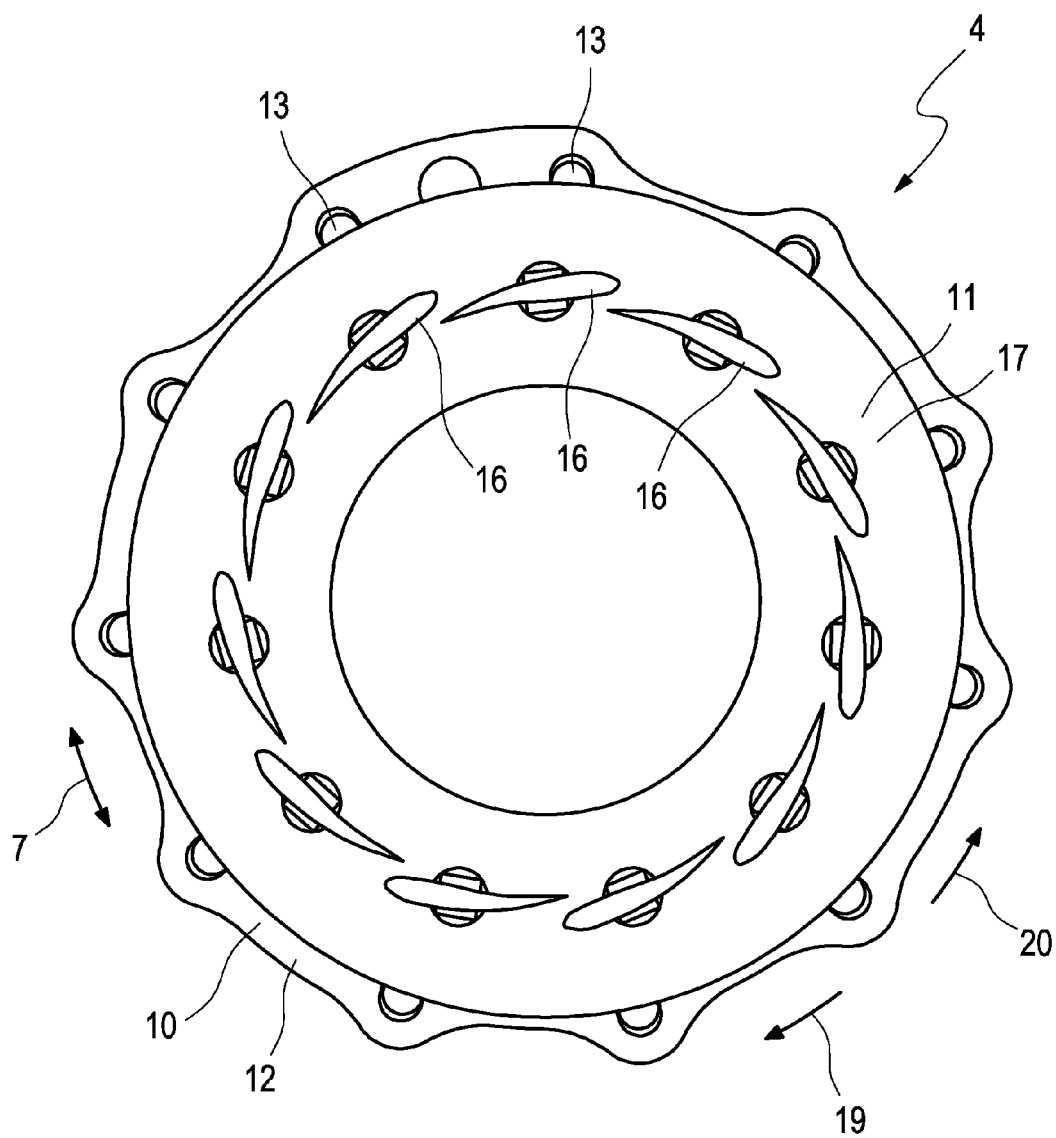
Figure 9:
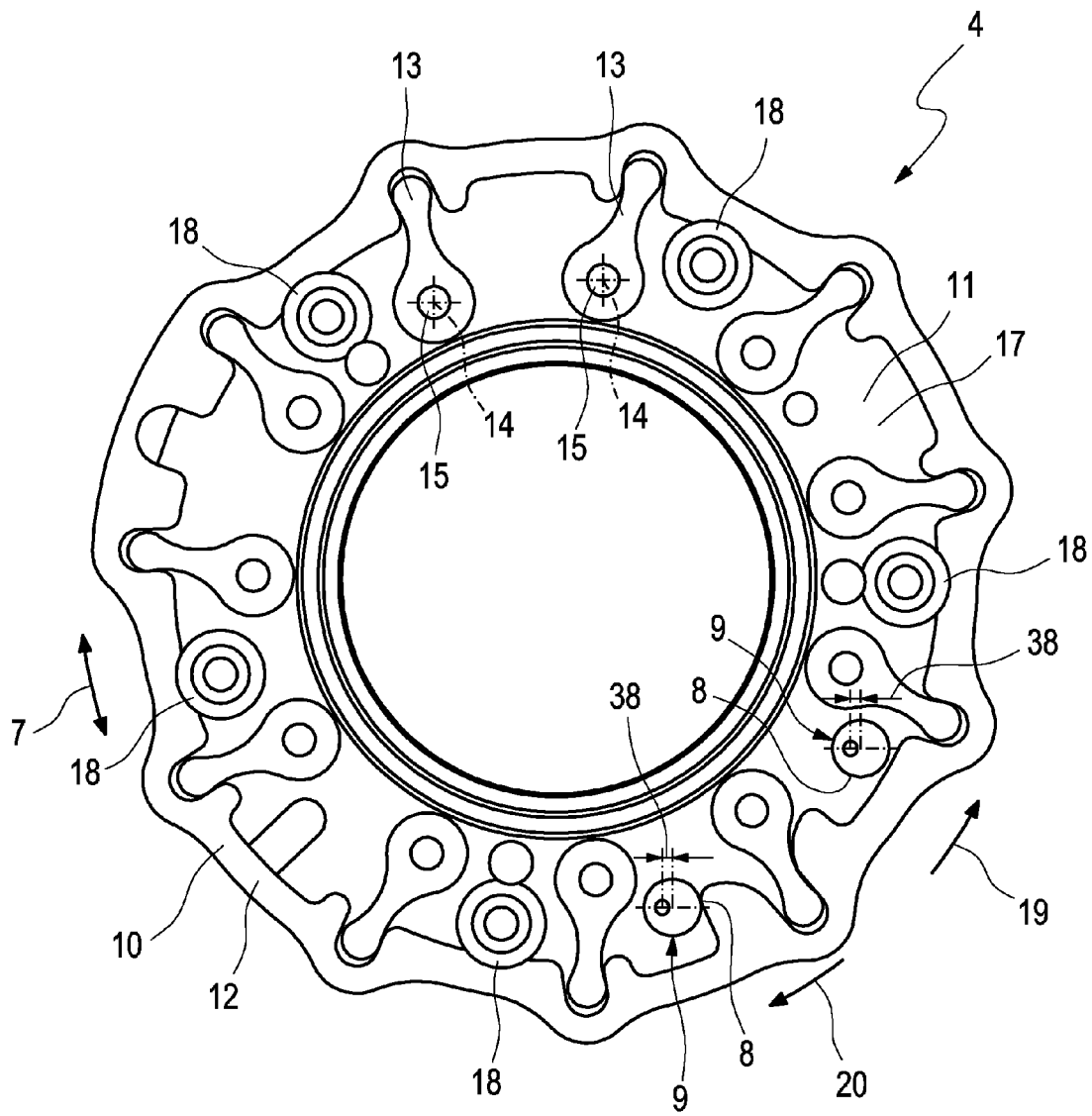
Figure 10:
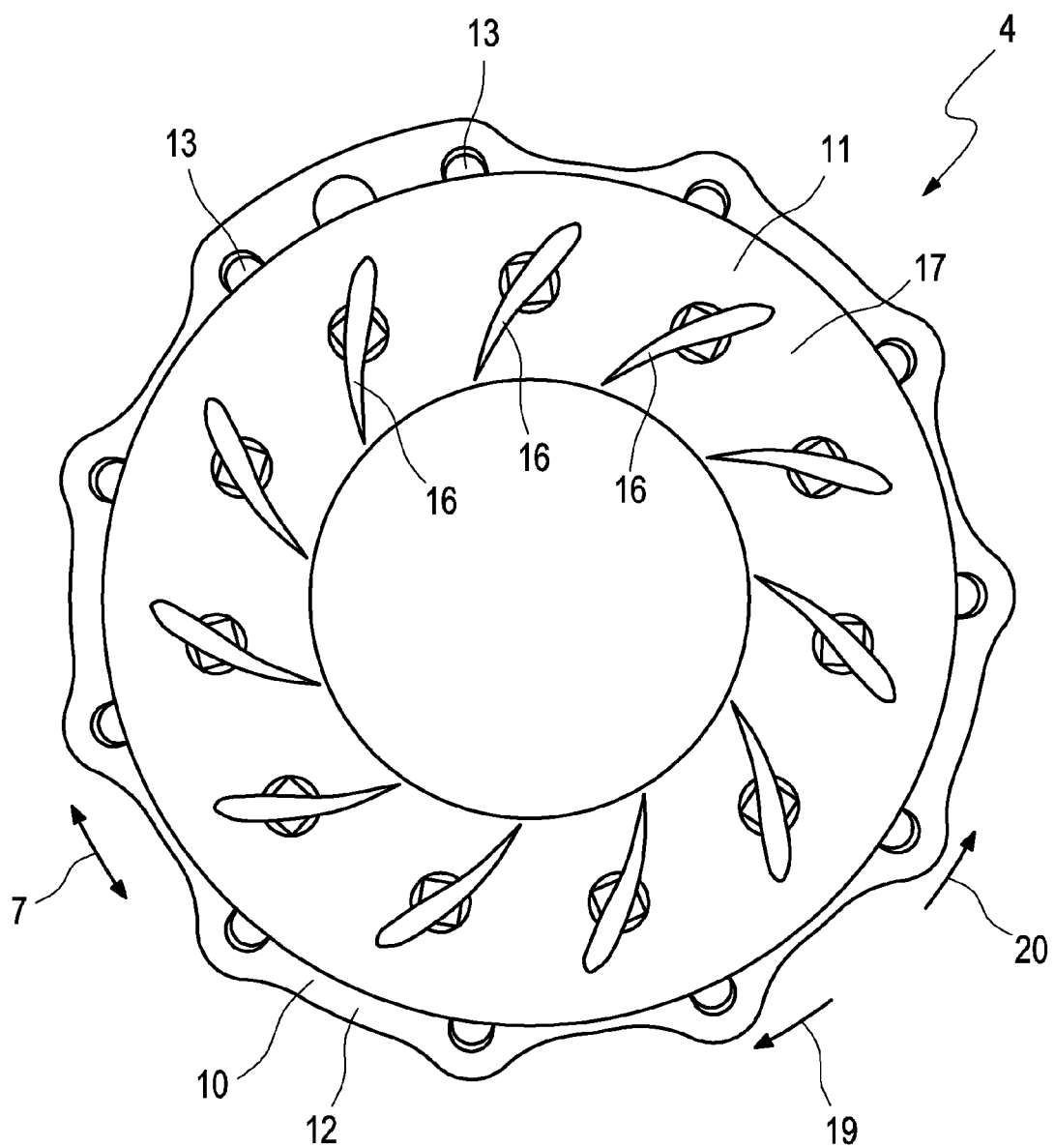

FIG. 6 shows an alternative embodiment, wherein the sleeve body 21 comprises a pulling sleeve section 35 at least for the assembly. During the assembly, this pulling sleeve section 35 protrudes from the opening 24. With the sleeve body 21 positioned axially and/or relative to the stationary component 11 with respect to its rotary position, axial pulling forces can now be introduced into the sleeve body 21 via the pulling sleeve section 35 in order to brace axial pressure forces which are introduced through the pulling sleeve section 35 against the core body 22. The desired radial bracing can be created in this manner. Here, too, it can be practically provided that the pulling sleeve section 35 is attached to the sleeve body 21 so that because of the axial pulling forces it breaks off as soon as the desired radial bracing is reached. Here, too, a predetermined breaking point 36 indicates the destroyed connection between the pulling sleeve section 35 and the remaining sleeve body 21.

FIG. 12 shows an embodiment, which manages without severable pull rod 33 or without severable pulling sleeve section 35. With this embodiment, the axial positioning of the sleeve body 21 relative to the stationary component 11 is realised with the help of a collar section 40, which radially projects from the sleeve body 21. With the sleeve body 21 completely inserted in the opening 24, this collar section 40 is furthermore axially braced against an enclosure 41, which rims the opening 24. The enclosure 41 thus forms a part of the stationary component 11 and merges into the inner wall 28. With this embodiment, the stop surface 23 for realising the limit stop 8 is disposed on the radial circumferential side of the sleeve body 21, so that in this case a radial limit stop is realised. To this end, the stop surface 23 can be again formed on a stop section 37 of the sleeve body 21 protruding from the opening 24. In the present case, the collar section 40 and the stop section 37 coincide, so that ultimately the retaining segment 37 simultaneously forms the collar section 40 and vice versa. Through an eccentricity 38 explained in more detail with respect to FIG. 11 between the sleeve body 21 and the stop section 37 or the collar section 40, the radial positioning of the stop surface 23 can be carried out by rotating the sleeve body 21, which takes place prior to the bracing of the sleeve body 21 against the stationary component 11. As soon as the desired radial positioning of the stop surface 23 is carried out, the radial bracing for fixing the rotary position between sleeve body 21 and stationary component 11 can be created. To this end, the core body 22, i.e. in this case the sphere, is pushed in or driven into the sleeve body 21 in the insertion direction of the sleeve body 21, i.e. in the direction in which the sleeve body 21 is inserted into the opening 24, which runs parallel to the longitudinal centre axis 27. The desired radial bracing which locks the sleeve body 21 against rotation and also axially on the stationary component 11 occurs through the interacting cross sections, i.e. the internal cone 29 and the spherical surface in this case.

It is particularly advantageous with this embodiment that the sleeve body 21 and the core body 22 can be mounted to the stationary component 11 from the same side and that the sleeve body 21 during the pressing-in of the core body 22 axially braces itself against the stationary component 11 via the collar section 40, as a result of which a pull rod 33 or a pulling sleeve section 35 for generating the reaction forces can be omitted.

With the embodiments shown in FIG. 2-6, the opening 24 is configured as through-opening. Because of this it is possible to let the pull rod 33 or the pulling sleeve section 35 protrude from the opening 24 on a side facing away from the stop surface 23 in order to realise the assembly. In contrast with this, FIGS. 11 and 12 each show an embodiment, wherein the opening 24 is closed off on one side. In this case, the pull rod 33 (if present) and the stop surface 23 are located on the same side during the assembly.

Figure 11:
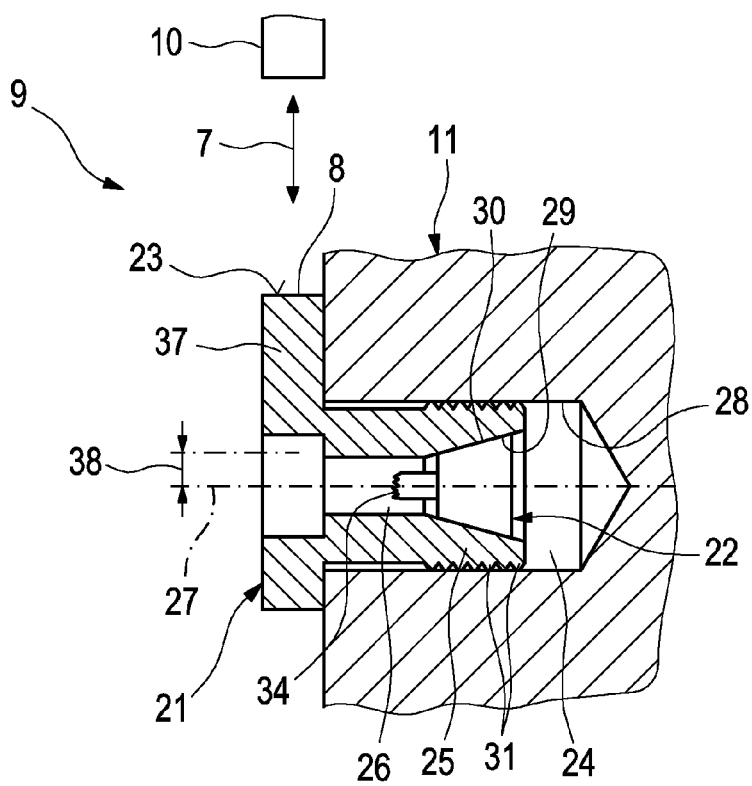

With the embodiments of FIGS. 2, 3, 11 and 12, the sleeve body 21 comprises a stop section 37 each, which in the assembled state protrudes from the opening 24 and which comprises the stop surface 23. With the embodiment shown in FIG. 2, the stop surface 23 is formed through an annular axial face end of the stop section 37. With the embodiment shown in FIG. 3, the sleeve body 21 is provided for example through forming, with a closed axial end in the region of the stop section 37 after the insertion of the core body 22. In this case, the stop surface 23 is formed through the closed axial end of the stop section 37. With the embodiments shown in FIGS. 11 and 12, the stop surface 23 is formed through a radial circumferential side of the stop section 37. Noticeably, this stop section 37 with the embodiments shown in FIGS. 11 and 12, is configured eccentrically with respect to the longitudinal centre axis 27 of the sleeve body 21. A corresponding eccentricity in this case is designated with 38. The eccentricity 38 is also noticeable in FIGS. 7 and 9. For example, the stop section 37 can be configured circular or elliptical or cam-shaped in profile.

With the embodiment shown in FIG. 6, the sleeve body 21 can be configured solid or as solid body in the region of the stop section 37, since in this case because of the pulling sleeve section 35, the core body 22 can be inserted on the opposite side. Accordingly, the stop surface 23 with this embodiment is also formed in a closed axial end of the stop section 37.

With the embodiment shown in FIG. 4, the stop surface 23 is formed on the limit stop body 32, which is disposed on the sleeve body 21, namely on the stop section 37 protruding from the opening 24.

Figure 5:
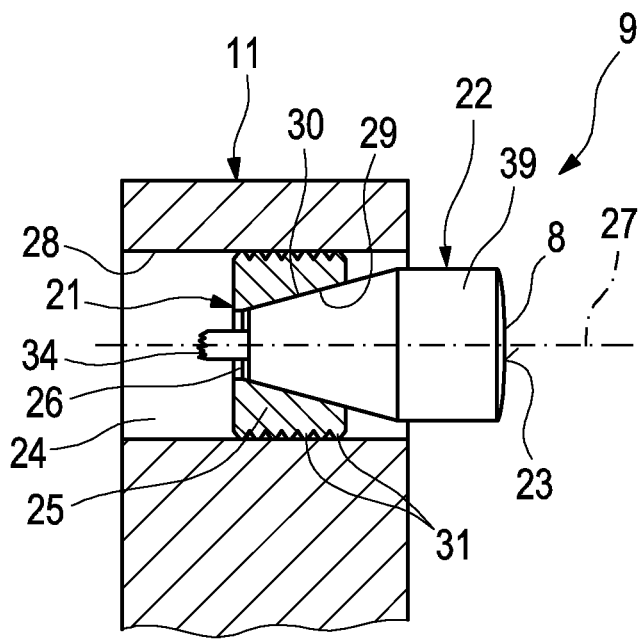

With the embodiment shown in FIG. 5, the stop surface 23 is formed on a stop section 39 of the core body 22, which protrudes from the opening 24. In this case, the sleeve body 21 is entirely arranged in the interior of the opening 24 and substantially consists only of its retaining segment 25.

With the embodiments of FIG. 2-6, the stop surface 23 is axially arranged with respect to the longitudinal centre axis 27, as a result of which in this case an axial stop each is realised with the help of the limit stop device 9. In contrast with this, the stop surface 23 with the embodiment shown in FIGS. 11 and 12, is orientated radially with respect to the longitudinal centre axis 27, so that the limit stop device 9 in this case realises a radial limit stop. Through the eccentricity 38 provided in the embodiment shown in FIGS. 11 and 12 between the stop section 37 and the remaining sleeve body 21, an adjustment of the radial limit stop can be realised through rotating the sleeve body 21, since upon rotating the sleeve body 21 relative to the stationary component 11 the spacing of the region of the stop surface 23 forming the stop 8 changes along the circumferential side relative to the longitudinal centre axis 27.

With the exemplary embodiments shown here, the mobile component 10 and the stationary component 11 are parts of the charging device 1. With the embodiment shown in FIG. 1, the mobile component 10 is formed through the actuator 3, while the stationary component 11 is formed by the turbine housing 2 or by a console fastened to the turbine housing 2. With the embodiment shown in FIG. 7-10, the mobile component 10 is formed through the actuating ring 12, while the stationary component 11 is formed by the guide blade carrier 17.

The invention claimed is:
1. A limit stop device for limiting an adjustment path of a mobile component relative to a stationary component, comprising:

a sleeve body configured to be inserted into an opening formed in the stationary component, the sleeve body including a retaining segment disposed in the interior of the opening, a core body disposed in an interior of the sleeve body for radially bracing the retaining segment against an inner wall of the stationary component thereby axially fixing the sleeve body on the stationary component, and a stop surface protruding into the adjustment path of the mobile component configured to limit the adjustment path of the mobile component, wherein the sleeve body in the retaining segment includes one of an internal cone and an axially tapering internal cross section, and the core body respectively includes one of an outer cone and a convexly curved external cross section, the one of the internal cone and the axially tapering internal cross section configured to interact respectively with the one of the outer cone and the convexly curved external cross section for radially bracing the retaining segment.

2. The limit stop device according to claim 1, wherein the core body is at least one of axially and rotationally fixed in the sleeve body via radially bracing the core body against said sleeve body.

3. The limit stop device according to claim 1, wherein the stop surface is formed on at least one of the sleeve body, the core body, and a limit stop body disposed on at least one of the sleeve body and the core body.

4. The limit stop device according to claim 1, wherein the sleeve body in the retaining segment is the internal cone configured to interact with the outer cone of the core body for radially bracing the retaining segment.

5. The limit stop device according to claim 1, wherein the sleeve body in the retaining segment is the axially tapering internal cross section, and wherein the core body is configured as a sphere.

6. The limit stop device according to claim 1, further comprising a radially projecting protrusion arranged on the outside of the sleeve body, wherein the protrusion is configured to extend radially outwardly from the sleeve body, wherein the protrusion includes a plurality of protrusions arranged at least one of axially and adjacent in the circumferential direction around the sleeve body.

7. The limit stop device according to claim 1, wherein the core body includes a pull rod protruding from the opening, wherein the pull rod, with the sleeve body positioned axially, is configured to create axial pulling forces into the core body for radially bracing the retaining segment.

8. The limit stop device according to claim 7, wherein the pull rod is attached to the core body and is configured to detach in response to the axial pulling forces causing a desired radial bracing to be reached.

9. The limit stop device according to claim 1, wherein the sleeve body includes a pulling sleeve section protruding from the opening, the pulling sleeve section with the sleeve body positioned axially, is configured to create axial pulling forces into the sleeve body via the pulling sleeve section to create axial pressure forces onto the core body through the pulling sleeve section for radially bracing the retaining segment.

10. The limit stop device according to claim 9, wherein the pulling sleeve section is attached to the sleeve body and is configured to detach in response to the axial pulling forces causing a desired radial bracing to be reached.

11. The limit stop device according to claim 1, wherein the sleeve body includes a radially projecting collar section axially braced against an enclosure trimming the opening, and wherein the core body in the insertion direction of the sleeve body is axially pressed into the sleeve body for radially bracing the retaining segment.

12. The limit stop device according to claim 1, wherein the sleeve body includes a stop section protruding from the opening and comprising the stop surface, and wherein the stop surface is formed at least one of through an annular axial face end of the stop section, through a closed axial end of the stop section, and through a radial circumferential side of the stop section.

13. The limit stop device according to claim 1, wherein the stop surface is formed on a limit stop body disposed on a stop section of the sleeve body protruding from the opening.

14. The limit stop device according to claim 1, wherein the mobile component and the stationary component are parts of an exhaust gas turbocharger.

15. The limit stop device according to claim 14, wherein the mobile component is an actuator of a variable turbine geometry, wherein the stationary component is at least one of a turbine housing and a console arranged on the turbine housing.

16. The limit stop device according to claim 14, wherein the mobile component is an actuating ring of a variable turbine geometry, wherein actuating arms of adjustable guide blades of the variable turbine geometry are jointly rotated, and wherein the stationary component is a guide blade carrier of the variable turbine geometry, on which the adjustable guide blades are rotatable.

17. The limit stop device according to claim 1, wherein the stop surface is formed on a stop section of the core body protruding from the opening.

18. The limit stop device according to claim 1, further comprising a friction increasing layer on the outside of the sleeve body, wherein the friction increasing layer is a chemical nickel matrix with silicon carbine particles embedded therein.

19. A charging device, comprising:
a limit stop device for limiting an adjustment path of a mobile component relative to a stationary component, wherein the mobile component is an actuator of a variable turbine geometry and the stationary component is at least one of a turbine housing and a console arranged on the turbine housing, and wherein the limit stop device includes:
a sleeve body configured to be inserted into an opening formed in the stationary component, the sleeve body including a retaining segment disposed in the interior of the opening,
a core body disposed in the interior of the sleeve body for radially bracing the retaining segment against an inner wall of the stationary component, thereby axially fixing the sleeve body on the stationary component, and
a stop surface protruding into the adjustment path of the mobile component configured to limit the adjustment path of the mobile component.

20. A limit stop device for limiting an adjustment path of a mobile component relative to a stationary component, comprising:

a sleeve body configured to be inserted into an opening formed in the stationary component, the sleeve body including a retaining segment disposed in an interior of the opening;

a core body disposed in the interior of the sleeve body for radially bracing the retaining segment against an inner wall of the stationary component and facilitating at least one of an axial fixing and a rotational fixing of the sleeve body in the opening; and a stop surface protruding into the adjustment path of the mobile component configured to limit the adjustment path of the mobile component;

wherein one of:

the core body includes a pull rod protruding from the opening, wherein the pull rod, with the sleeve body positioned axially in the opening, is configured to facilitate transmission of axial pulling forces into the core body for radially bracing the retaining segment; and the sleeve body includes a pulling sleeve section protruding from the opening, and wherein the pulling sleeve section, with the sleeve body positioned axially in the opening, is configured to facilitate transmission of axial pulling forces into the sleeve body to impart axial pressure forces onto the core body through the pulling sleeve section for radially bracing the retaining segment.

21. The limit stop device according to claim 20, wherein: the pull rod is attached to the core body and is configured to detach in response to the axial pulling forces causing a desired radial bracing to be reached.

22. The limit stop device according to claim 20, wherein the pulling sleeve section is attached to the sleeve body and is configured to detach in response to the axial pulling forces causing a desired radial bracing to be reached.

* * * * *